US011473478B1

United States Patent
Ott et al.

(10) Patent No.: US 11,473,478 B1
(45) Date of Patent: Oct. 18, 2022

(54) SYSTEM AND METHOD FOR MONITORING AN EXHAUST AFTERTREATMENT SYSTEM

(71) Applicant: PACCAR Inc., Bellevue, WA (US)

(72) Inventors: Trevor Joseph Ott, Anacortes, WA (US); Cynthia Chaffin Webb, Sedro-Woolley, WA (US); Charles Wayne Reinhardt Swart, Bellingham, WA (US)

(73) Assignee: PACCAR Inc., Bellevue, WA (US)

( * ) Notice: Subject to any disclaimer, the term of this patent is extended or adjusted under 35 U.S.C. 154(b) by 0 days.

(21) Appl. No.: 17/482,252

(22) Filed: Sep. 22, 2021

(51) Int. Cl.
*F01N 11/00* (2006.01)
*F01N 3/20* (2006.01)
*G01M 15/10* (2006.01)
*F01N 3/10* (2006.01)

(52) U.S. Cl.
CPC ............ *F01N 11/007* (2013.01); *F01N 3/103* (2013.01); *F01N 3/208* (2013.01); *G01M 15/104* (2013.01); *F01N 2900/1402* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0053772 A1* | 3/2006 | Dou | ...................... | F01N 3/0885 60/285 |
| 2008/0216466 A1* | 9/2008 | Morita | ................ | F02D 41/1445 60/299 |
| 2012/0227383 A1* | 9/2012 | Charial | ................... | F01N 3/208 60/274 |
| 2012/0255286 A1* | 10/2012 | Matsunaga | ............. | F01N 3/106 60/287 |
| 2014/0060012 A1* | 3/2014 | Kakimoto | .......... | G01N 27/4074 60/277 |
| 2018/0223759 A1* | 8/2018 | Nilsson | .................. | F02M 26/00 |

* cited by examiner

*Primary Examiner* — Binh Q Tran
(74) *Attorney, Agent, or Firm* — Quinn IP Law

(57) ABSTRACT

An exhaust aftertreatment system and associated method for purifying an exhaust gas feedstream of a lean-burn or other compression-ignition internal combustion engine is described. An instruction set is executable to determine an engine-out NO2 concentration upstream of an oxidation catalyst and determine a first parameter associated with O2 concentration. A consumption of oxygen in the oxidation catalyst due to oxidation reactions is determined, and a concentration of NO2 generated by the oxidation catalyst is determined based upon the consumption of oxygen in the oxidation catalyst. A concentration of NO2 downstream of the oxidation catalyst is determined. A NO2/NOx ratio in the exhaust gas feedstream downstream of the oxidation catalyst is determined based upon the concentration of NO2 downstream of the oxidation catalyst and the NOx concentration measured by the downstream NOx sensor. The oxidation catalyst is evaluated based upon the NO2/NOx ratio.

20 Claims, 2 Drawing Sheets

SYSTEM AND METHOD FOR MONITORING AN EXHAUST AFTERTREATMENT SYSTEM

INTRODUCTION

Exhaust aftertreatment systems fluidly couple to internal combustion engines to purify exhaust gases that are generated as byproducts of combustion. Byproducts of combustion may include unburned hydrocarbons, carbon monoxide, nitrides of oxide (NOx), and particulate matter. Exhaust aftertreatment systems may include one of or combinations of oxidation catalysts, reduction catalysts, selective catalytic reduction catalysts, particulate filters, and other elements. When employed on heavy-duty diesel engines or other lean-burning configurations, an exhaust aftertreatment system may include a diesel oxidation catalyst (DOC) to oxidize nitric oxide (NO), a diesel particulate filter (DPF) for control of particulate matter (PM), one or more selective catalytic reduction (SCR) systems for NOx reduction, and/or an ammonia oxidation catalyst to eliminate or minimize ammonia slip. Operation of the internal combustion engine and the exhaust aftertreatment system may be monitored by one or more sensing devices that are disposed in the exhaust gas feedstream. Operation may also be determined employing simulation models that dynamically execute during operation.

SCR catalysts may employ reductants for reducing NOx molecules to elemental nitrogen. One reductant is urea, which may be transformed into ammonia (NH3) in an exhaust aftertreatment system. The reductant may be injected into the exhaust gas feedstream upstream of one or multiple SCR catalysts and may be stored on a surface or otherwise captured for use in reducing NOx molecules to elemental nitrogen and water. Performance of known SCR catalysts is dependent upon temperature, with increased performance being related to increased exhaust gas temperatures.

There is a need to provide a hardware architecture implementation for an exhaust aftertreatment system and associated method to monitor performance of elements of the exhaust aftertreatment system, including the DOC, to improve heavy-duty diesel NOx emissions.

SUMMARY

An exhaust aftertreatment system and associated method for purifying an exhaust gas feedstream of a lean-burn or other compression-ignition internal combustion engine is described. The system and method for purifying the exhaust gas feedstream includes an oxidation catalyst arranged upstream of a selective catalytic reduction (SCR) catalyst. Elements of the aftertreatment system include a first oxygen sensor arranged to monitor an exhaust gas feedstream upstream of the oxidation catalyst, a second oxygen sensor arranged to monitor the exhaust gas feedstream downstream of the oxidation catalyst, and a downstream NOx sensor arranged to monitor an exhaust gas feedstream downstream of the oxidation catalyst.

A controller is in communication with the first and second wide-band oxygen sensors, and the downstream NOx sensor. The controller includes an instruction set that is executable to determine an engine-out NO2 concentration in the exhaust gas feedstream upstream of the oxidation catalyst, and determine, via the first oxygen sensor, a first parameter associated with O2 concentration in the exhaust gas feedstream upstream of the oxidation catalyst. A consumption of oxygen in the oxidation catalyst due to oxidation reactions is determined via the first oxygen sensor and the second oxygen sensor, and a first concentration of NO2 generated by the oxidation catalyst is determined based upon the consumption of oxygen in the oxidation catalyst. A second concentration of NO2 downstream of the oxidation catalyst is determined based upon the engine-out NO2 concentration and the first concentration of NO2 that is generated by the oxidation catalyst. A NO2/NOx ratio in the exhaust gas feedstream downstream of the oxidation catalyst is determined based upon the second concentration of NO2 downstream of the oxidation catalyst and the NOx concentration measured by the downstream NOx sensor. The oxidation catalyst is evaluated by the controller based upon the NO2/NOx ratio.

An aspect of the disclosure includes the first concentration of NO2 generated by the oxidation catalyst being based upon a consumption of oxygen by HC oxidation and by CO oxidation in the oxidation catalyst.

Another aspect of the disclosure includes determining, via the first oxygen sensor and the second oxygen sensor, the consumption of oxygen in the oxidation catalyst due to HC oxidation and by CO oxidation in the oxidation catalyst.

Another aspect of the disclosure includes determining, via the first oxygen sensor and the second oxygen sensor, a consumption of oxygen in a first selective catalytic reduction (SCR) catalyst due to NOx reduction that is arranged upstream of the oxidation catalyst.

Another aspect of the disclosure includes determining, via the first oxygen sensor and the second oxygen sensor, a consumption of oxygen in the oxidation catalyst due to HC oxidation and CO oxidation in the oxidation catalyst and a consumption of oxygen in the first SCR catalyst due to the NOx reduction in the SCR catalyst.

Another aspect of the disclosure includes a first NOx sensor being arranged to monitor the exhaust gas feedstream upstream of the oxidation catalyst, and the engine-out NO2 concentration in the exhaust gas feedstream upstream of the oxidation catalyst being determined based upon an input from the first NOx sensor.

Another aspect of the disclosure includes an executable model being employed to determine the engine-out NO2 concentration in the exhaust gas feedstream upstream of the oxidation catalyst based upon operation of the internal combustion engine.

Another aspect of the disclosure includes a fault associated with the oxidation catalyst being detected when the NO2/NOx ratio downstream of the oxidation catalyst is greater than a maximum threshold, or when the NO2/NOx ratio downstream of the oxidation catalyst is less than a minimum threshold.

Another aspect of the disclosure includes the first and second oxygen sensors being wide-band oxygen sensors.

Another aspect of the disclosure includes a second selective catalytic reduction (SCR) catalyst arranged downstream of the oxidation catalyst, wherein the downstream NOx sensor is arranged to monitor an exhaust gas feedstream downstream of the second SCR catalyst.

Another aspect of the disclosure includes a method for monitoring an oxidation catalyst for a lean-burn internal combustion engine that includes determining an engine-out NO2 concentration in an exhaust gas feedstream upstream of the oxidation catalyst, and determining, via a first oxygen sensor, a first O2 concentration in the exhaust gas feedstream upstream of the oxidation catalyst. A consumption of oxygen in the oxidation catalyst due to oxidation reactions is determined via the first oxygen sensor and a second oxygen sensor. A first concentration of NO2 generated by the oxidation catalyst is determined based upon the consumption of oxygen in the oxidation catalyst, and a second concentration of NO2 downstream of the oxidation catalyst is determined based upon the engine-out NO2 concentration and the first concentration of NO2 that is generated by the oxidation catalyst. A NO2/NOx ratio in the exhaust gas feedstream downstream of the oxidation catalyst is determined based upon the second concentration of NO2 downstream of the oxidation catalyst and the NOx concentration measured by a downstream NOx sensor. The oxidation catalyst is evaluated based upon the NO2/NOx ratio downstream of the oxidation catalyst.

Another aspect of the disclosure includes a method for monitoring an oxidation catalyst for a lean-burn internal combustion engine that includes determining a consumption of oxygen in the oxidation catalyst due to oxidation reactions, determining a first concentration of NO2 that is generated by the oxidation catalyst based upon the consumption of oxygen in the oxidation catalyst, and determining a second concentration of NO2 downstream of the oxidation catalyst based upon an engine-out NO2 concentration and the first concentration of NO2 that is generated by the oxidation catalyst. A NO2/NOx ratio downstream of the oxidation catalyst is determined based upon the second concentration of NO2 downstream of the oxidation catalyst and a NOx concentration measured by a downstream NOx sensor.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
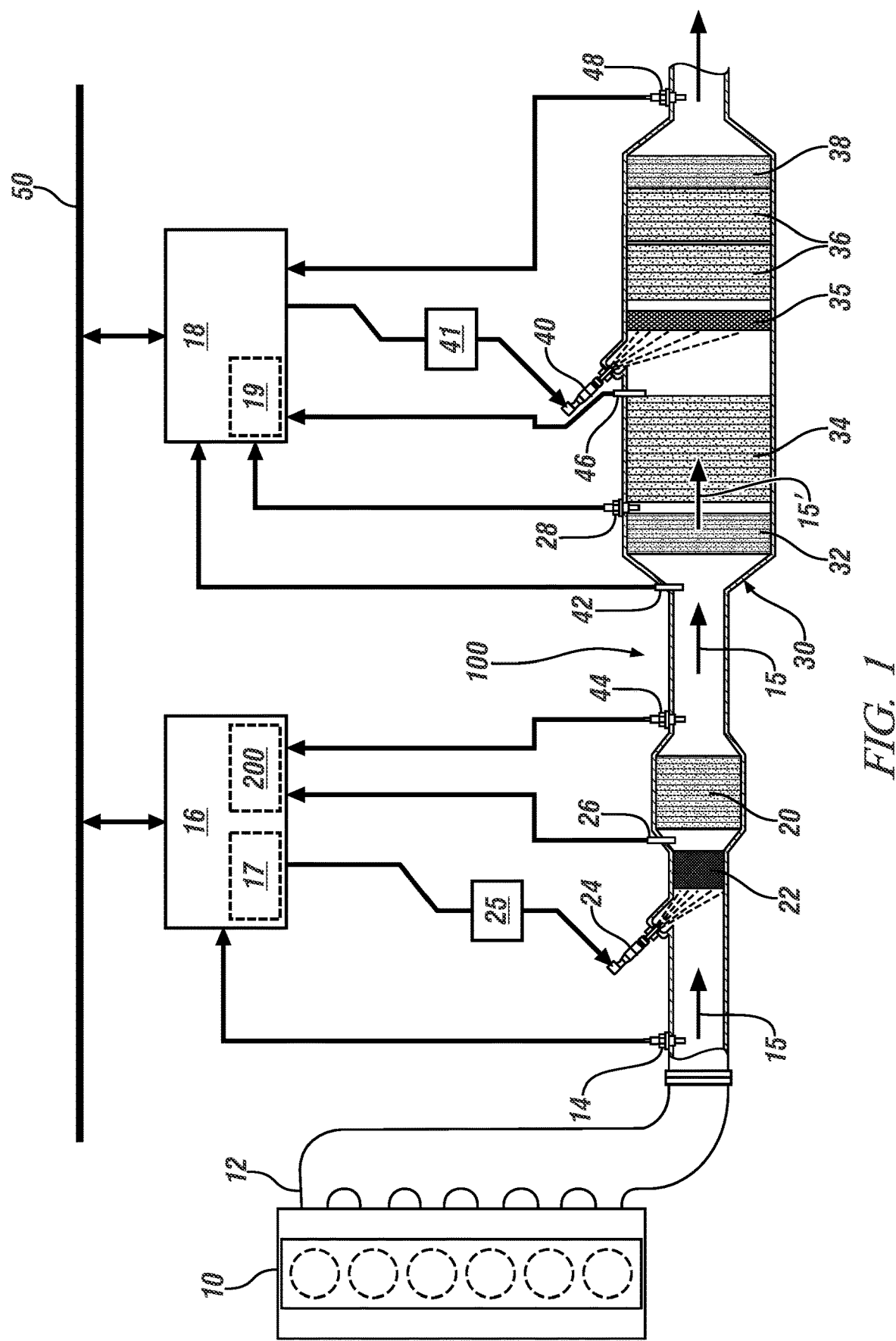
FIG. 1 schematically illustrates an internal combustion engine and an exhaust aftertreatment system, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by any expressed or implied theory presented herein. Throughout the drawings, corresponding reference numerals indicate like or corresponding parts and features. As used herein, the terms "system" and "subsystem" may refer to one of or a combination of mechanical and electrical devices, actuators, sensors, controllers, application-specific integrated circuits (ASIC), combinatorial logic circuits, software, firmware, and/or other components that are arranged to provide the described functionality. As employed herein, the term "upstream" and related terms refer to elements that are towards an origination of a flow stream relative to an indicated location, and the term "downstream" and related terms refer to elements that are away from an origination of a flow stream relative to an indicated location. The term 'model' refers to a processor-based or processor-executable code and associated calibration that simulates a physical existence of a device or a physical process. The use of ordinals such as first, second and third does not necessarily imply a ranked sense of order, but rather may only distinguish between multiple instances of an act or structure.

Referring to the drawings, wherein like reference numerals correspond to like or similar components throughout the several Figures, FIG. 1, consistent with embodiments disclosed herein, schematically illustrates elements of an embodiment of an exhaust aftertreatment system 100 for purifying the exhaust gas feedstream 15 of an internal combustion engine 10, wherein the internal combustion engine 10 is controlled to operate primarily in a lean-burn air/fuel ratio combustion environment. The exhaust aftertreatment system 100 is configured to purify the exhaust gas feedstream 15 to achieve target tailpipe emissions in-use.

One example of the internal combustion engine 10 is a multi-cylinder compression-ignition internal combustion engine that is classified as a heavy-duty (HD) engine. In one embodiment, the internal combustion engine 10 is disposed on a vehicle. The vehicle may include, but not be limited to a mobile platform in the form of a heavy-duty commercial vehicle, an industrial vehicle, an agricultural vehicle, a watercraft, or a train. Alternatively, the internal combustion engine 10 may be arranged as a stationary device, such as for powering an electric power generator.

The exhaust gas feedstream 15 generated by the internal combustion engine 10 may contain various byproducts of combustion, including unburned hydrocarbons, carbon monoxide, nitrides of oxide (NOx), particulate matter, etc. The exhaust gas feedstream 15 is monitored by a first oxygen sensor 13, and in some embodiments, a second engine-out exhaust gas sensor that is referred to hereinafter as a first NOx sensor 14. In one embodiment, the first oxygen sensor 13 is a wide-band oxygen sensor that is capable of monitoring the exhaust gas feedstream 15 over a range of air/fuel ratios from less than 20:1 to greater than 60:1. The first NOx sensor 14 is an engine-out exhaust gas sensor that is capable of monitoring NOx constituents in the exhaust gas feedstream 15 for purposes of monitoring and/or controlling operation of the engine 10 and monitoring one or more elements of the exhaust aftertreatment system 100. In one embodiment, the first NOx sensor 14 may be supplemented by or supplanted with a controller-executed algorithmic model that is capable of estimating NOx constituents in the exhaust gas feedstream 15 based upon engine operating parameters. In addition, there may be one or more other engine-out exhaust gas sensors (not shown) that are capable of monitoring one or multiple constituents of the exhaust gas feedstream 15, including, e.g., another NOx sensor, a temperature sensor, etc.

Engine control includes controlling various engine operating parameters, including controlling engine control states to minimize various exhaust gas constituents through chemical reaction processes that include, by way of non-limiting examples, oxidation, reduction, filtering, and selective reduction. Other engine control states include controlling operating parameters to warm up the engine 10 and control heat transfer to various elements of the exhaust aftertreatment system 100 to effect efficacious operation thereof. Heat transfer to the elements of the exhaust aftertreatment system 100 may be employed for warmup and catalyst light-off, regeneration of a particulate filter, etc.

The exhaust aftertreatment system 100 includes, in one embodiment, a first selective catalytic reduction (SCR) catalyst 20 that is arranged upstream of an exhaust subsystem 30. In some embodiments, the exhaust aftertreatment system 100 includes only the exhaust subsystem 30.

When the exhaust aftertreatment system 100 includes only the exhaust subsystem 30, it is configured to purify the exhaust gas feedstream 15 of the internal combustion engine 10 to achieve a first tailpipe emissions target in-use. When the exhaust aftertreatment system 100 includes the first SCR catalyst 20 upstream of the exhaust subsystem 30, it is configured to purify the exhaust gas feedstream 15 to achieve a second tailpipe emissions target in-use, wherein the second tailpipe emissions target is less than the first tailpipe emissions target that is achievable with the exhaust subsystem 30 alone. The tailpipe emissions targets may be in the form of regulatory emissions targets that are imposed by the US Environmental Protection Agency, the California Air Resources Board, the European Union, or other regulatory bodies. The tailpipe emissions targets may instead be in the form of in-house or user emissions targets, such as may be imposed by a private fleet owner.

The first SCR catalyst 20 may be placed in an engine compartment in an underhood location, and thus may be closely coupled to the engine 10. The first SCR catalyst 20 may be fluidly coupled to an exhaust manifold 12 of the engine 10, or to a fluid outlet of a turbocharger or supercharger of the engine 10. Alternatively, the first SCR catalyst 20 may be located underbody.

A first reductant delivery system 25 is arranged to inject a reductant into the exhaust gas feedstream upstream of the first SCR catalyst 20. Operation of the first reductant delivery system 25 may be controlled by a first controller 16. The first reductant delivery system 25 includes, in one embodiment, a single reductant injector 24 having an injection nozzle that is positioned to inject reductant into the exhaust gas feedstream upstream of the first SCR catalyst 20. The first reductant delivery system 25 is configured to controllably supply a metered flow of reductant into the exhaust gas feedstream 15 upstream of the first SCR catalyst 20 to facilitate NOx reduction therethrough. The first controller 16 is operatively connected to the first reductant delivery system 25 and in communication with the first NOx sensor 14 and the first temperature sensor 26. The first controller 16 includes a first instruction set 17 that is executable to control the first reductant delivery system 25 to inject reductant into the exhaust gas feedstream 15 upstream of the first SCR catalyst 20 based upon inputs from the first NOx sensor 14, and a second, downstream NOx sensor 48 that is arranged to monitor the exhaust gas feedstream at the tailpipe downstream of the exhaust subsystem 30, and other sensors.

In one embodiment, a first heating device 22 is arranged to transfer heat to the exhaust gas feedstream upstream of the first SCR catalyst 20. In one embodiment, the first heating device 22 is a controllable heating element that is arranged in the exhaust gas feedstream 15 upstream of the first SCR catalyst 20. The first heating device 22 may be an electrically-powered resistive heater or heating element, a burner, or another heater, to inject heat energy into the exhaust gas flow and the injected reductant. In one embodiment, a first temperature sensor 26 is arranged to monitor temperature of the exhaust gas feedstream 15 upstream of the first SCR catalyst 20. In one embodiment, an additional exhaust gas sensor 44 is arranged to monitor the exhaust gas feedstream 15 downstream of the first SCR catalyst 20. In one embodiment, the additional exhaust gas sensor 44 monitors constituents in the exhaust gas feedstream 15 for purposes of monitoring and/or controlling operation of the engine 10 and/or the first reductant delivery system 25. The additional exhaust gas sensor 44 may be configured to monitor one or constituents of the exhaust gas feedstream 15, including, e.g., a NOx sensor, etc. In one embodiment, a second oxidation catalyst (not shown) is arranged upstream of the first SCR catalyst 20. The first controller 16 interfaces and communicates with other controllers e.g., second controller 18 and an engine controller, via a communication bus 50.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, e.g., communication bus 50, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

In one embodiment, the first SCR catalyst 20 is a catalytic element that employs a reductant to reduce NOx molecules to form elemental nitrogen (N2) and other inert gases. In one embodiment, the reductant is urea, which can be converted to ammonia (NH3) that is stored on the substrate of the first SCR catalyst 20. Alternatively, the reductant may be gaseous ammonia. The first SCR catalyst 20 includes a ceramic or metallic substrate having flow channels that have been coated with suitable materials that include by way of non-limiting examples: metals, such as vanadium, copper, cerium, and/or other materials. The coated materials effect chemical reactions to reduce, in the presence of ammonia, NOx molecules in the exhaust gas feedstream to form elemental nitrogen (N2) and other inert gases, under certain conditions of the exhaust gas feedstream related to temperature, flowrate, air/fuel ratio and others.

The exhaust subsystem 30 includes a plurality of fluidly connected exhaust purifying elements for purifying engine exhaust gas prior to expulsion out the tailpipe to ambient air. An exhaust purifying element is a device that is configured to oxidize, reduce, filter and/or otherwise treat constituents of the exhaust gas feedstream 15, including but not limited to hydrocarbons, carbon monoxide, nitrides of oxygen (NOx), particulate matter, and ammonia. In the non-limiting embodiment shown, first, second, third, and fourth exhaust purifying elements 32, 34, 36, and 38, respectively, are arranged in series.

The first exhaust purifying element 32 is an oxidation catalyst for oxidizing NO and other constituents in the exhaust gas feedstream 15, in certain embodiments, and is referred to hereafter as an oxidation catalyst 32.

The second exhaust purifying element 34 is a particulate filter for filtering particulate matter from the exhaust gas feedstream, in one embodiment.

The third exhaust purifying element 36 is a selective catalyst reduction (SCR) catalyst, i.e., a second SCR catalyst 36 in one embodiment. In one embodiment, the second SCR catalyst 36 is a urea-based device that employs gaseous ammonia to react with and reduce NOx molecules to form elemental nitrogen (N2) and other inert gases. The injected reductant may be urea, which can be converted to ammonia (NH3), and stored on the substrate of the second SCR catalyst 36 to react with and reduce NOx molecules. A second reductant delivery system 41 is arranged to inject reductant into the exhaust gas feedstream 15' upstream of the second SCR catalyst 36.

In one embodiment, a second heating element 35 may be interposed in the exhaust gas feedstream downstream of the second exhaust purifying element 34 and upstream of the third exhaust purifying element 36, and may be, in one embodiment, an electrically-powered resistive heater or heating element, a burner, or another heater, to inject heat energy into the exhaust gas flow and the injected reductant.

The fourth exhaust purifying element 38 may be an ammonia oxidation catalyst that is arranged downstream of the second SCR catalyst 36 and operates to oxidize unused ammonia from the second SCR catalyst 36 to eliminate or minimize ammonia slip in one embodiment.

The second reductant delivery system 41 includes, in one embodiment, a second reductant injector 40 having an injection nozzle that is positioned to inject reductant into the exhaust gas feedstream downstream of the second exhaust purifying element 34, i.e., the particulate filter, and upstream of the second SCR catalyst 36. The second reductant delivery system 41 is configured to controllably supply a metered flow of reductant into the exhaust gas feedstream 15' upstream of the second SCR catalyst 36 to facilitate NOx reduction through the second SCR catalyst 36.

Operation of the second reductant delivery system 41 may be controlled by a second controller 18. The second reductant delivery system 41 is configured to controllably supply a metered flow of reductant into the exhaust gas feedstream upstream of the second SCR catalyst 36 to facilitate NOx reduction therethrough. The second controller 18 is operatively connected to the second reductant delivery system 41 and in communication with the second NOx sensor 48, a second temperature sensor 42, and a third temperature sensor 46. The second controller 18 includes a second instruction set 19 that is executable to control the second reductant delivery system 41 to inject reductant into the exhaust gas feedstream 15' upstream of the second SCR catalyst 36 based upon inputs from the various sensors.

Each of the first, second, third, and fourth exhaust purifying elements 32, 34, 36, and 38, respectively, includes a ceramic or metallic substrate having flow channels that have been coated with suitable materials that include by way of non-limiting examples: platinum-group metals such as platinum, palladium and/or rhodium; other metals, such as vanadium, copper, cerium, and/or other materials. The coated materials effect chemical reactions to oxidize, reduce, filter, or otherwise treat constituents of the exhaust gas feedstream under certain conditions related to temperature, flowrate, air/fuel ratio and others. The embodiment shown includes the elements of the exhaust aftertreatment system 100 in one arrangement, which is illustrative. Other arrangements of the elements of the exhaust aftertreatment system 100 may be employed within the scope of this disclosure, with such arrangements including the addition of other exhaust purifying elements and/or omission of one or more of the exhaust purifying elements, depending upon requirements of the specific application.

The sensors for monitoring the various exhaust purifying elements of the exhaust subsystem 30 include a second oxygen sensor 28 that is arranged in the exhaust gas feedstream downstream of the oxidation catalyst 32, the second (downstream) NOx sensor 48, and, in one embodiment, temperature sensors 42, 46. Other sensors (not shown) may include, for example, a particulate matter sensor, a delta pressure sensor for monitoring pressure drop across the SCR catalyst 36, additional temperature sensors, and/or other sensing devices and models for monitoring the exhaust gas feedstream. The second NOx sensor 48 may have wide-band air/fuel ratio sensing capability. Such sensors and models may be arranged to monitor or otherwise determine parameters relegated to the exhaust gas feedstream at specific locations. As such, the aforementioned sensors and/or models may be advantageously employed to monitor performance of individual ones of the exhaust purifying elements, monitor parameters associated with performance of a subset of the exhaust purifying elements, or monitor parameters associated with performance of the exhaust aftertreatment system 100.

The first controller 16 includes the first instruction set 17 that is executable to control the first reductant delivery system 25 to inject the reductant into the exhaust gas feedstream 15 upstream of the first SCR catalyst 20, on systems that employ the first reductant delivery system 25. This includes the first instruction set 17 being executed to control the first reductant delivery system 25 to inject the reductant into the exhaust gas feedstream 15 upstream of the first SCR catalyst 20 to achieve a target reductant/NOx ratio that is input to the first SCR catalyst 20 to achieve a first target NOx reduction level, on systems that employ the first reductant delivery system 25. Alternatively, or in addition, the first controller 16 controls, via the first instruction set 17, the first reductant delivery system 25 to inject the reductant into the exhaust gas feedstream 15 upstream of the first SCR catalyst 20 to achieve a target ammonia storage level on the first SCR catalyst 20 in anticipation of a projected need for NOx reduction, and as part of controlling the exhaust gas feedstream that is input to the exhaust aftertreatment system 100.

The second controller 18 includes the second instruction set 19 that is executable to control the second reductant delivery system 41 to inject the reductant into the exhaust gas feedstream 15' upstream of the second SCR catalyst 36, on systems that employ the second reductant delivery system 41. The second instruction set 19 is executed to control the second reductant delivery system 41 to inject the reductant into the exhaust gas feedstream 15' upstream of the second SCR catalyst 36 to achieve a target reductant/NOx ratio that is input to the second SCR catalyst 36 to achieve a second target NOx reduction level. Alternatively, or in addition, the second controller 18 controls, via the second instruction set 19, the second reductant delivery system 41 to inject the reductant into the exhaust gas feedstream 15' upstream of the second SCR catalyst 36 to achieve a target ammonia storage level on the second SCR catalyst 36 in anticipation of a projected need for NOx reduction, and as part of controlling the exhaust gas feedstream that is input to the exhaust aftertreatment system 100.

Figure 2:
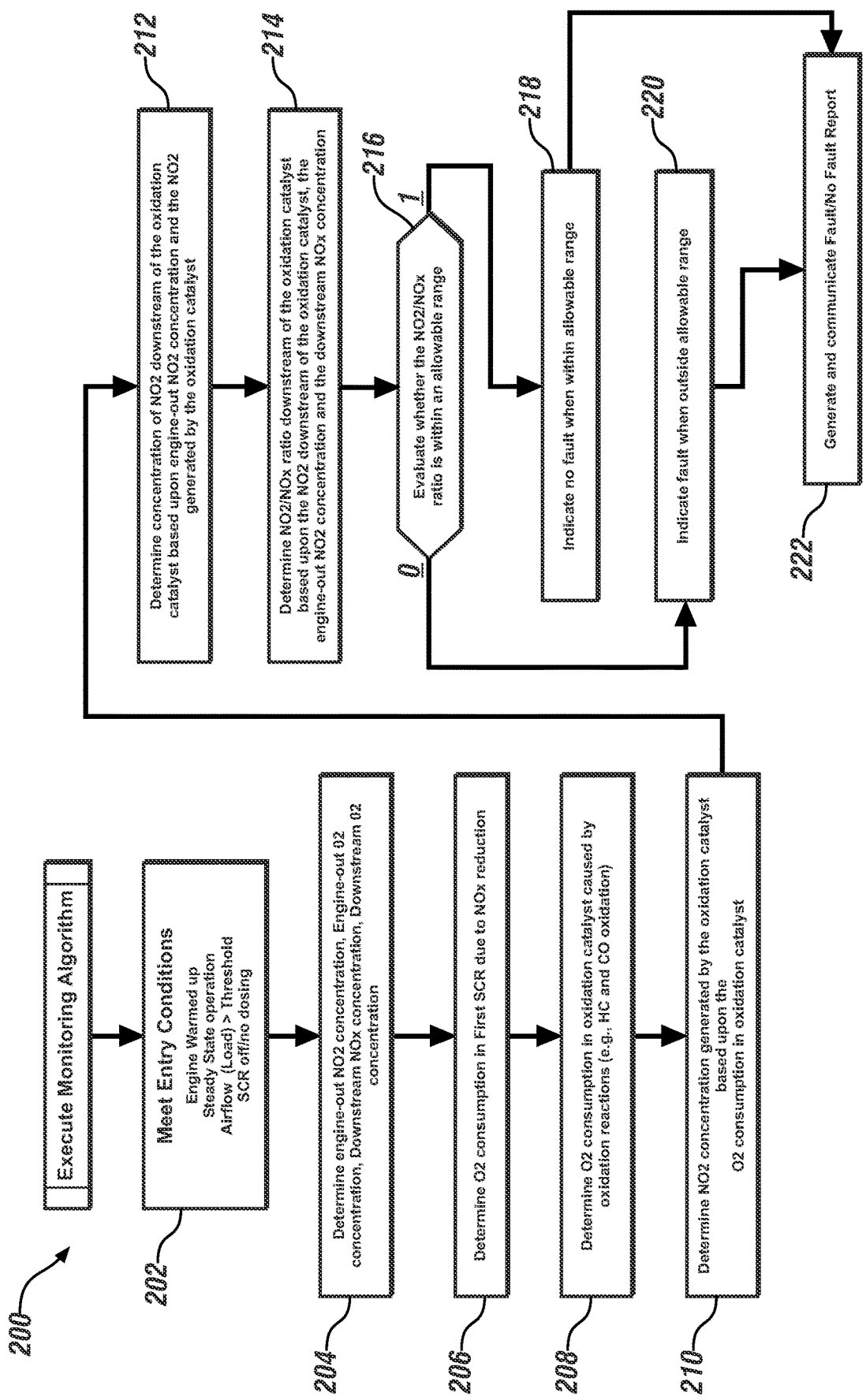
FIG. 2 schematically illustrates a flowchart for a control routine to monitor an oxidation catalyst that is arranged upstream of an SCR catalyst of an embodiment of an exhaust aftertreatment system, in accordance with the disclosure.

Referring now to FIG. 2 with continued reference to an embodiment of the exhaust aftertreatment system 100 that is described with reference to FIG. 1, a method, routine, and/or monitoring algorithm 200 are described for monitoring the oxidation catalyst 32 employing information that is provided by the first oxygen sensor 13 arranged upstream of the oxidation catalyst 32, and the second oxygen sensor 28 arranged downstream of the oxidation catalyst 32. Information from the first and second oxygen sensors is employed by the monitoring algorithm 200 to evaluate the capability of the oxidation catalyst 32 to oxidize NO to form NO2.

The oxidation catalyst 32 oxidizes NO in the exhaust gas feedstream to form NO2, thus increasing an NO2/NOx ratio when compared to the engine-out NO2/NOx ratio. The increased NO2/NOx ratio improves SCR conversion efficiency in a downstream SCR catalyst in the presence of a reductant, up to an optimum point. However, when the NO2/NOx ratio is greater than the optimum point, there is a negative effect on NOx conversion efficiency in the downstream SCR catalyst. Evaluating the capability of the oxidation catalyst 32 to oxidize NO facilitates determining the capability of the exhaust aftertreatment system 100 to convert NOx emissions to N2 and oxygen, including implementation of an oxidation catalyst efficiency diagnostic.

Referring again to FIG. 2, the monitoring algorithm 200 is illustrated as a collection of blocks in a logical flow graph, which represents a sequence of operations that can be implemented in hardware, software, and/or firmware components that have been configured to perform the specified functions. In the context of software, the blocks represent computer instructions that, when executed by one or more processors, perform the recited operations. Furthermore, although the various steps shown in the flowchart diagram appear to occur in a chronological sequence, at least some of the steps may occur in a different order, and some steps may be performed concurrently or not at all. For convenience and clarity of illustration, the monitoring algorithm 200 is described with reference to the internal combustion engine 10 and exhaust aftertreatment system 100 shown in FIG. 1.

TABLE 1

| BLOCK | BLOCK CONTENTS |
|---|---|
| 202 | Determine that entry criteria are met |
| 204 | Determine engine-out NO2 concentration, Engine-out O2 concentration, Downstream NOx concentration, Downstream O2 concentration |
| 206 | Determine O2 consumption in First SCR catalyst |
| 208 | Determine O2 consumption in oxidation catalyst |
| 210 | Determine first NO2 concentration generated by oxidation catalyst |
| 212 | Determine second concentration of NO2 downstream of the oxidation catalyst |
| 214 | Determine NO2/NOx ratio downstream of the oxidation catalyst |
| 216 | Evaluate NO2/NOx ratio |
| 218 | Indicate no fault in oxidation catalyst |
| 220 | Indicate fault in oxidation catalyst |
| 222 | Report out |

Execution of the monitoring algorithm 200 may proceed as follows. As employed herein, the term "1" indicates an answer in the affirmative, or "YES", and the term "0" indicates an answer in the negative, or "NO".

The initial step of the monitoring algorithm 200 is to determine whether entry criteria to enable further execution of the monitoring algorithm 200 are met (Step 202). The entry criteria include, by way of non-limiting examples, determining that the internal combustion engine 10 is in a warmed-up state and is operating at or near a steady-state speed/load operating condition, determining that the airflow, and thus engine load, is greater than a minimum threshold, and determining that the first reductant delivery system 25 of the first SCR catalyst 20 is deactivated, i.e., determining that the first SCR catalyst 20 is not being used to actively reducing NOx emissions.

Inputs from the first oxygen sensor 13, the first NOx sensor 14 (when used), the second oxygen sensor 28, and the second NOx sensor 48 are monitored to determine an engine-out NO2 concentration, an engine-out O2 concentration, a downstream NOx concentration, and a downstream O2 concentration (Step 204).

The measurements from the first oxygen sensor 13 and the second oxygen sensor 28 are used to determine conversion of NO to NO2 in the oxidation catalyst 32 with the arrangement as shown in the exhaust aftertreatment system 100 described with reference to FIG. 1. This technique is based on the following chemical reaction equations.

Oxidation of NO to NO2, which can be completed in the oxidation catalyst at the warmed-up operating temperature is expressed as follows.

$$2NO + O_2 \Rightarrow 2NO_2 \qquad [1]$$

The NOx reduction reaction, as completed in the SCR catalyst, is expressed as follows.

$$4NO + 4NH_3 + O_2 \Rightarrow 4N_2 + 6H_2O \qquad [2]$$

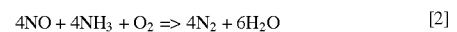

The fast NOx reduction reaction, as completed in the SCR catalyst, is expressed as follows.

$$NO + NO_2 + 2NH_3 \Rightarrow 2N_2 + 3H_2O \qquad [3]$$

The NOx reduction reaction, completed in the SCR catalyst, is expressed as follows.

$$6NO_2 + 8NH_3 \Rightarrow 2N_2 + 3H_2O \qquad [4]$$

The oxidation of CO to CO2, completed in the oxidation catalyst at operating temperature, is expressed as follows.

$$2CO + O_2 \Rightarrow 2CO_2 \qquad [5]$$

The oxidation of HC completed in the oxidation catalyst at operating temperature; where a and b are # of atoms (H and C respectively), is expressed as follows.

$$C_bH_a + (b + a/2)O_2 = bCO_2 + a/2 H_2O \qquad [6]$$

To determine the amount of NO oxidized by the oxidation catalyst 32, the engine-out concentrations for NO2, HC and CO can be measured via the aforementioned sensors and/or modeled based upon engine operating parameters.

All engine-out NO2 is consumed by the first SCR catalyst 20 during NOx reduction.

The O2 consumption for oxidation of CO, HC and reduction of NOx in the first SCR catalyst 20 is performed by monitoring the O₂ concentrations in the exhaust gas both prior to the first SCR catalyst 20 and after the oxidation catalyst 32. With the NO2 production measured (or modeled) and a delta in NOx concentration in the exhaust over the first SCR catalyst 20, the O2 consumption can be determined as follows:

Calculating the engine-out NO concentration (eoNO) is determined as follows:

$$eoNO = NO_{XS1} = eoNO2 \qquad [7]$$

wherein:
eoNO is the engine-out NO concentration,
$NO_{XS1}$ is the NOx concentration from the first NOx sensor 14, and
eoNO2 is the Engine-out NO2 concentration.

Calculating the NO concentration consumed by a fast NOx reaction (EQ. 3) is determined as follows:

$$NO = (eoNO - eoNO2) \qquad [8]$$

Subtracting the unreduced NOx yields as follows:

$$NO_{reduced} = (NO - NO_{XS2}) \qquad [9]$$

wherein:
$NO_{XS2}$ is the NOx concentration from the second NOx sensor 48.

The O2 consumption in the first SCR catalyst 20 due to NOx reduction is determined as follows (Step 206):

$$O2_{NOx} = eoO2_{s1} - (NO_{reduced}/4) \qquad [10]$$

wherein:
$O2_{NOx}$ is the $O_2$ consumed by NOx reduction in the first SCR catalyst 20,
eoNO is the engine-out NO concentration, and
$eoO2_{s1}$ is the O2 concentration measured by the first NOx sensor 14.

The O2 consumption in the oxidation catalyst 32 caused by oxidation reactions including HC and CO oxidation is determined as follows (Step 208) using the following relationship:

$$O2_{HC\&CO} = O2_{S1} - O2_{S2} - O2_{NOx} \qquad [11]$$

wherein:
$O2_{HC\&CO}$ is the $O_2$ consumed by oxidation of HC & CO
$O2_{S1}$ is the O2 concentration from the first oxygen sensor 13,
$O2_{S2}$ is the O2 concentration from the second oxygen sensor 28, and
$O2_{NOx}$ is the O2 consumed by NOx reduction in first SCR catalyst 20.

With $O_2$ consumption known for HC and CO oxidation, then the first SCR catalyst 20 does not reduce NOx and instead allows NOx to pass through to the oxidation catalyst 32. Monitoring the change in O2 concentrations will allow for the NO2 make-up of the oxidation catalyst 32 to be determined.

The NO2 concentration generated by the oxidation catalyst 32 is determined based upon the O2 consumption in the oxidation catalyst 32, as follows (Step 210):

$$NO2_{DOC} = (O2_{S1} - O2_{S2} - O2_{HC\&CO}) * 2 \qquad [12]$$

wherein:
$NO2_{DOC}$ is the $NO_2$ generated by the oxidation catalyst 32,
$O2_{S1}$ is the $O_2$ concentration from the first oxygen sensor 13,
$O2_{S2}$ is the $O_2$ concentration from the second oxygen sensor 28, and
$O2_{HC\&CO}$ is the $O_2$ consumed by oxidation of HC and CO in the first SCR catalyst 20.

The second NO2 concentration downstream of the oxidation catalyst 32 is determined based upon the engine-out NO2 concentration and the first NO2 concentration generated by the oxidation catalyst 32 (Step 212), as follows. The total NO2 levels in the exhaust gas can be determined by the relation:

$$NO_2 = eoNO_2 + NO2_{DOC} \qquad [13]$$

wherein:

$NO_2$ is the second NO2 concentration downstream of the oxidation catalyst 32, $eoNO_2$ is the engine-out NO2 concentration, and $NO_{2DOC}$ is the first NO2 concentration, i.e., the NO2 generated by the oxidation catalyst 32.

A NO2/NOx ratio downstream of the oxidation catalyst 32 is determined based upon the second NO2 concentration downstream of the oxidation catalyst 32, the engine-out NO2 concentration and the downstream NOx concentration (step 214). The NO2/NOx ratio into the underbody SCR catalyst 36 can be determined as follows:

$$NO2/NOx = NO_2/NO_{XS2} \qquad [14]$$

wherein:

$NO_2$/NOx is the ratio between NO2 to NOx, $NO_2$ is the second NO2 concentration downstream of the oxidation catalyst 32, and $NO_{XS2}$ is the NOx concentration from the second NOx sensor 48 that is downstream of the oxidation catalyst 32.

The NO2/NOx ratio downstream of the oxidation catalyst 32 is evaluated to determine whether it is within an allowable range (Step 216). The allowable range for the NO2/NOx ratio is an application-specific calibrated value, and may be determined and clarified during engine system development at another time.

When the NO2/NOx ratio downstream of the oxidation catalyst 32 is within the allowable range (Step 216)(1), no fault is indicated (Step 218), and a report is generated that is communicated to another on-board or off-board controller indicating that the oxidation catalyst 32 is operating in compliance with its specification.

When the NO2/NOx ratio downstream of the oxidation catalyst 32 is greater than a maximum threshold of the allowable range, or less than a minimum threshold of the allowable range (Step 216)(0), a fault is indicated, and a report is generated that is communicated to another on-board or off-board controller indicating a potential fault with the oxidation catalyst 32 that may require further action (Step 220).

When the NO2 production of the oxidation catalyst 32 is greater than the upper threshold, or less than the lower threshold (Step 222), it indicates a potential occurrence of a fault associated with the oxidation catalyst 32. Various operating conditions related to the internal combustion engine 10 and the exhaust aftertreatment system 100 may be captured and stored in the second controller 18 for further evaluation and for use in root cause analysis.

The second controller 18 can generate an oxidation catalyst fault report indicating either an absence of a fault in the oxidation catalyst 32 (No Fault), or a potential occurrence of a fault associated with the oxidation catalyst 32 (Fault). The oxidation catalyst fault report may be communicated to another on-board controller, and then to a vehicle operator via a dashboard indicator lamp. The oxidation catalyst fault report may be communicated to a diagnostic scan tool, such as in response to an inquiry. The oxidation catalyst fault report may be communicated, via wireless communication, to a remotely-located controller that may employ the information for purposes of vehicle and fleet management. The vehicle may be scheduled for service for purposes of further diagnostics and repair in response to the potential occurrence of a fault associated with the oxidation catalyst 32. In this manner, an oxidation catalyst for an embodiment of an exhaust aftertreatment system of a lean-burn internal combustion engine may be regularly and periodically monitored employing upstream and downstream NOx sensors to detect occurrence of a fault.

Furthermore, when the NO2 production of the oxidation catalyst is above or below minimum or maximum thresholds during certain operating conditions, it may negatively affect emissions performance of the exhaust aftertreatment system 100.

As used herein, the terms "system" and "subsystem" may refer to one of or a combination of mechanical and electrical devices, actuators, sensors, controllers, application-specific integrated circuits (ASIC), combinatorial logic circuits, software, firmware, and/or other components that are arranged to provide the described functionality. As employed herein, the term "upstream" and related terms refer to elements that are towards an origination of a flow stream relative to an indicated location, and the term "downstream" and related terms refer to elements that are away from an origination of a flow stream relative to an indicated location. As employed herein, the term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. As employed herein, the terms "calibration", "calibrated", and related terms refer to a result or a process that correlates a desired parameter and one or multiple perceived or observed parameters for a device or a system. A calibration as described herein may be reduced to a storable parametric lookup table, a plurality of executable equations or another suitable form that may be employed as part of a measurement or control routine. As employed herein, a parameter is defined as a measurable quantity that represents a physical property of a device or other element that is discernible using one or more sensors and/or a physical model. A parameter can have a discrete value, e.g., either "1" or "0", or can be infinitely variable in value. The use of ordinals such as first, second and third does not necessarily imply a ranked sense of order, but rather may only distinguish between multiple instances of an act or structure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A system for monitoring an oxidation catalyst for a lean-burn internal combustion engine, the system comprising:
    a first oxygen sensor arranged to monitor an exhaust gas feedstream upstream of the oxidation catalyst;
    a second oxygen sensor arranged to monitor the exhaust gas feedstream downstream of the oxidation catalyst;
    a downstream NOx sensor arranged to monitor an exhaust gas feedstream downstream of the oxidation catalyst; and
    a controller, in communication with the first and second oxygen sensors, and the downstream NOx sensor;

the controller including an instruction set, wherein the instruction set is executable to:
- determine an engine-out NO2 concentration in the exhaust gas feedstream upstream of the oxidation catalyst;
- determine, via the first oxygen sensor, a first parameter associated with O2 concentration in the exhaust gas feedstream upstream of the oxidation catalyst;
- determine, via the first oxygen sensor and the second oxygen sensor, a consumption of oxygen in the oxidation catalyst due to oxidation reactions;
- determine a first concentration of NO2 generated by the oxidation catalyst based upon the consumption of oxygen in the oxidation catalyst;
- determine a second concentration of NO2 downstream of the oxidation catalyst based upon the engine-out NO2 concentration and the first concentration of $NO_2$ that is generated by the oxidation catalyst;
- determine a NO2/NOx ratio in the exhaust gas feedstream downstream of the oxidation catalyst based upon the second concentration of NO2 downstream of the oxidation catalyst and a NOx concentration measured by the downstream NOx sensor; and
- evaluate the NO2/NOx ratio in the exhaust gas feedstream downstream of the oxidation catalyst.

2. The system of claim 1, wherein the instruction set is executable to determine, via the first oxygen sensor and the second oxygen sensor, a consumption of oxygen in the oxidation catalyst due to HC oxidation and CO oxidation in the oxidation catalyst.

3. The system of claim 1, further comprising a first selective catalytic reduction (SCR) catalyst arranged upstream of the oxidation catalyst, wherein the instruction set is executable to determine, via the first oxygen sensor and the second oxygen sensor, a consumption of oxygen in the first SCR catalyst due to NOx reduction in the SCR catalyst.

4. The system of claim 3, wherein the instruction set is executable to determine, via the first oxygen sensor and the second oxygen sensor, a consumption of oxygen in the oxidation catalyst due to HC oxidation and CO oxidation in the oxidation catalyst and the consumption of oxygen in the first SCR catalyst due to the NOx reduction in the SCR catalyst.

5. The system of claim 1, further comprising a first NOx sensor arranged to monitor the exhaust gas feedstream upstream of the oxidation catalyst, wherein the instruction set is executable to determine the engine-out NO2 concentration in the exhaust gas feedstream upstream of the oxidation catalyst based upon an input from the first NOx sensor.

6. The system of claim 1, wherein the instruction set includes an executable model to determine the engine-out NO2 concentration in the exhaust gas feedstream upstream of the oxidation catalyst based upon operation of the internal combustion engine.

7. The system of claim 1, wherein the instruction set being executable to evaluate the NO2/NOx ratio in the exhaust gas feedstream downstream of the oxidation catalyst further comprises the instruction set being executable to detect a fault associated with the oxidation catalyst when the NO2/NOx ratio downstream of the oxidation catalyst is greater than a maximum threshold.

8. The system of claim 1, wherein the instruction set being executable to evaluate the NO2/NOx ratio in the exhaust gas feedstream downstream of the oxidation catalyst further comprises the instruction set being executable to detect a fault associated with the oxidation catalyst when the NO2/NOx ratio in the exhaust gas feedstream downstream of the oxidation catalyst is less than a minimum threshold.

9. The system of claim 1, further comprising a second selective catalytic reduction (SCR) catalyst arranged downstream of the oxidation catalyst, wherein the downstream NOx sensor is arranged to monitor an exhaust gas feedstream downstream of the second SCR catalyst.

10. A method for monitoring an oxidation catalyst for a lean-burn internal combustion engine, the method comprising:
- determining an engine-out NO2 concentration in an exhaust gas feedstream upstream of the oxidation catalyst;
- determining, via a first oxygen sensor, a first O2 concentration in the exhaust gas feedstream upstream of the oxidation catalyst;
- determining, via the first oxygen sensor and a second oxygen sensor, a consumption of oxygen in the oxidation catalyst due to oxidation reactions;
- determining a first concentration of NO2 generated by the oxidation catalyst based upon the consumption of oxygen in the oxidation catalyst;
- determining a second concentration of NO2 downstream of the oxidation catalyst based upon the engine-out NO2 concentration and the first concentration of NO2 that is generated by the oxidation catalyst;
- determining a NO2/NOx ratio in the exhaust gas feedstream downstream of the oxidation catalyst based upon the second concentration of NO2 downstream of the oxidation catalyst and a NOx concentration measured by a downstream NOx sensor; and
- evaluating the NO2/NOx ratio in the exhaust gas feedstream downstream of the oxidation catalyst.

11. The method of claim 10, comprising determining, via the first oxygen sensor and the second oxygen sensor, the consumption of oxygen in the oxidation catalyst due to HC oxidation and by CO oxidation in the oxidation catalyst.

12. The method of claim 10, comprising determining, via the first oxygen sensor and the second oxygen sensor, a consumption of oxygen in a first selective catalytic reduction (SCR) catalyst that is arranged upstream of the oxidation catalyst due to NOx reduction.

13. The method of claim 12, comprising determining, via the first oxygen sensor and the second oxygen sensor, a consumption of oxygen in the oxidation catalyst due to HC oxidation and CO oxidation in the oxidation catalyst and the consumption of oxygen in the first SCR catalyst due to the NOx reduction.

14. The method of claim 10, further comprising a first NOx sensor arranged to monitor the exhaust gas feedstream upstream of the oxidation catalyst, wherein the engine-out NO2 concentration in the exhaust gas feedstream upstream of the oxidation catalyst is determined based upon an input from the first NOx sensor.

15. The method of claim 10, comprising determining, via an executable model, the engine-out NO2 concentration in the exhaust gas feedstream upstream of the oxidation catalyst based upon operation of the internal combustion engine.

16. The method of claim 10, wherein evaluating the NO2/NOx ratio in the exhaust gas feedstream downstream of the oxidation catalyst comprises detecting a fault associated with the oxidation catalyst when the NO2/NOx ratio in the exhaust gas feedstream downstream of the oxidation catalyst is greater than a maximum threshold.

17. The method of claim 10, wherein evaluating the NO2/NOx ratio downstream of the oxidation catalyst comprises detecting a fault associated with the oxidation catalyst when the NO2/NOx ratio downstream of the oxidation catalyst is less than a minimum threshold.

18. A method for monitoring an oxidation catalyst for a lean-burn internal combustion engine, the method comprising:
   determining a consumption of oxygen in the oxidation catalyst due to oxidation reactions;
   determining a first concentration of NO2 that is generated by the oxidation catalyst based upon the consumption of oxygen in the oxidation catalyst;
   determining a second concentration of NO2 downstream of the oxidation catalyst based upon an engine-out NO2 concentration and the first concentration of NO2 that is generated by the oxidation catalyst; and
   determining a NO2/NOx ratio downstream of the oxidation catalyst based upon the second concentration of NO2 downstream of the oxidation catalyst and a NOx concentration measured by a downstream NOx sensor.

19. The method of claim 18, comprising determining the consumption of oxygen in the oxidation catalyst due to HC oxidation and CO oxidation in the oxidation catalyst.

20. The method of claim 18, further comprising detecting a fault associated with the oxidation catalyst when the NO2/NOx ratio downstream of the oxidation catalyst is less than a minimum threshold.

* * * * *